March 26, 1929.   G. B. COLEMAN   1,707,050
TRANSMISSION
Filed March 11, 1926   2 Sheets-Sheet 2

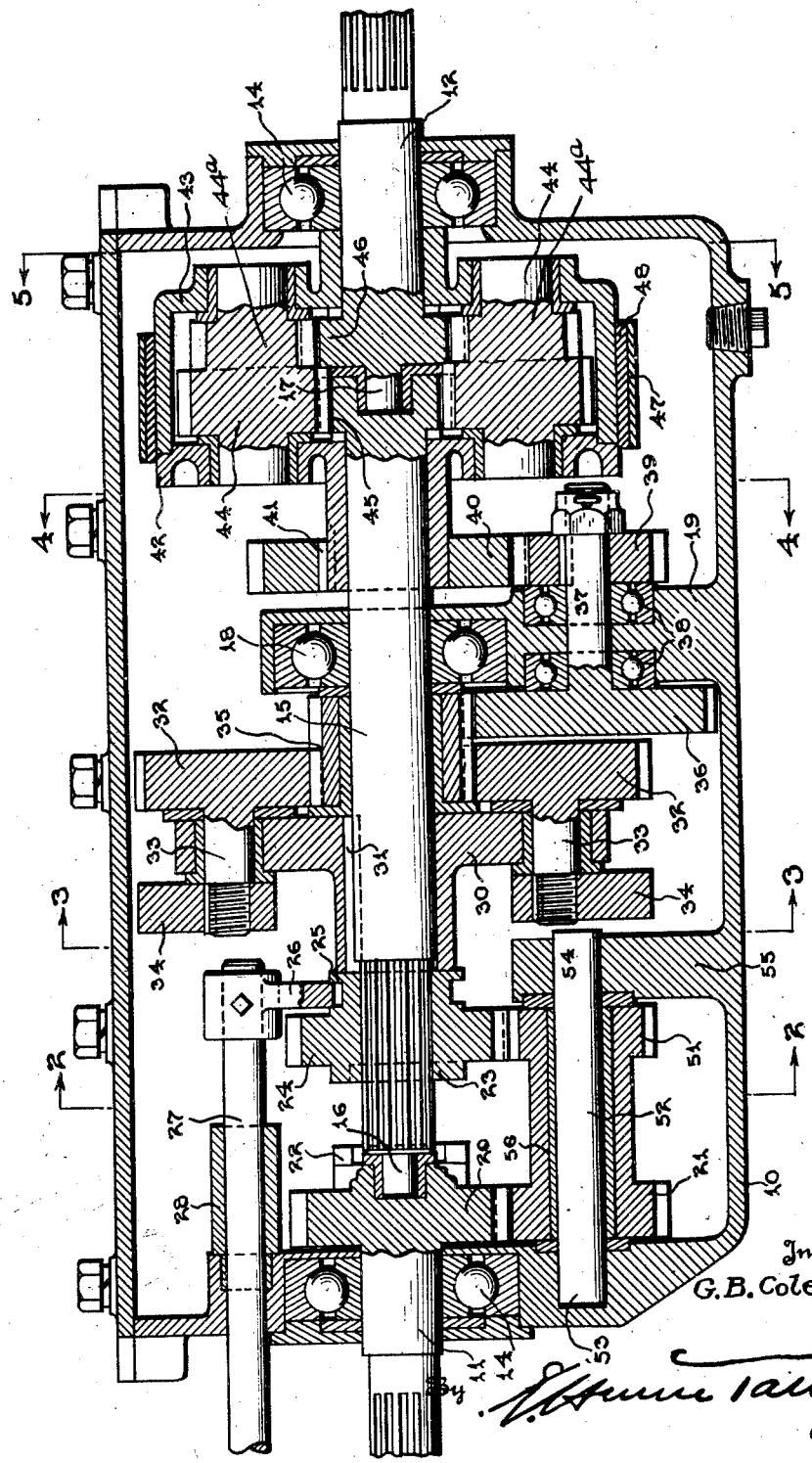

Inventor
G. B. Coleman
By
Attorney

Patented Mar. 26, 1929.

1,707,050

UNITED STATES PATENT OFFICE.

GEORGE B. COLEMAN, OF PHILADELPHIA, PENNSYLVANIA, ASSIGNOR TO COLEMAN AUTOMATIC TRANSMISSION COMPANY, A CORPORATION OF CALIFORNIA.

TRANSMISSION.

Application filed March 11, 1926. Serial No. 93,954.

The object of the invention is to provide a transmission which will automatically provide the increased torque necessary for starting heavy loads and gradually increase the speed of the load up to that of the driving member; to provide a transmission of this character in which the stalling of the prime mover by excessive loads will be precluded; to provide a transmission embodying the functions of a brake for the retardation of the load, as in the case of motor vehicles descending inclines; and to provide a construction of this character wherein the braking function is accomplished with the prime mover running forwardly and increased by the acceleration of the prime mover in a forward direction.

With this object in view, the invention consists of a construction and combination of parts of which a preferred embodiment is illustrated in the accompanying drawings, wherein:

Figure 1 is a central longitudinal sectional view of the invention.

Figure 3:
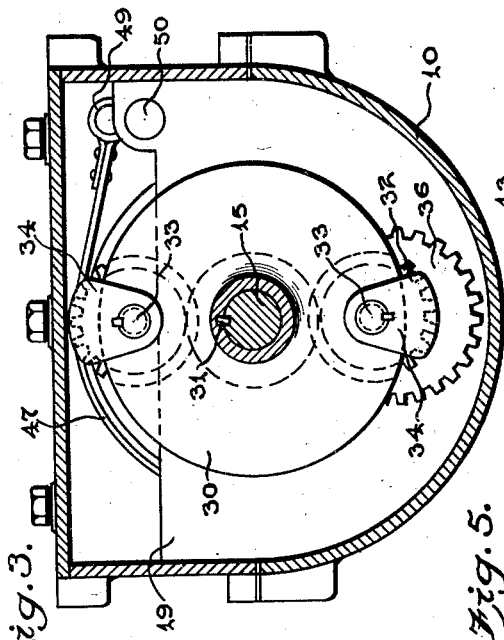
Figure 5:
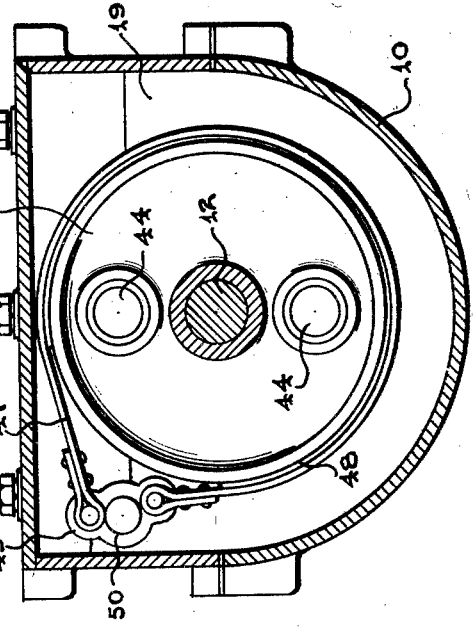
Figure 2:
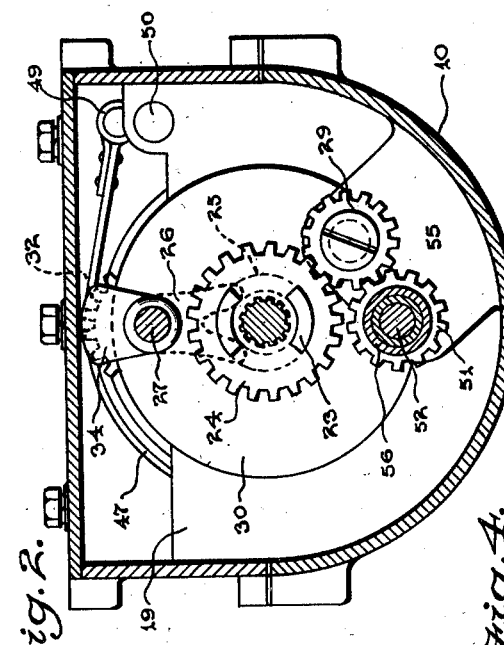
Figure 4:
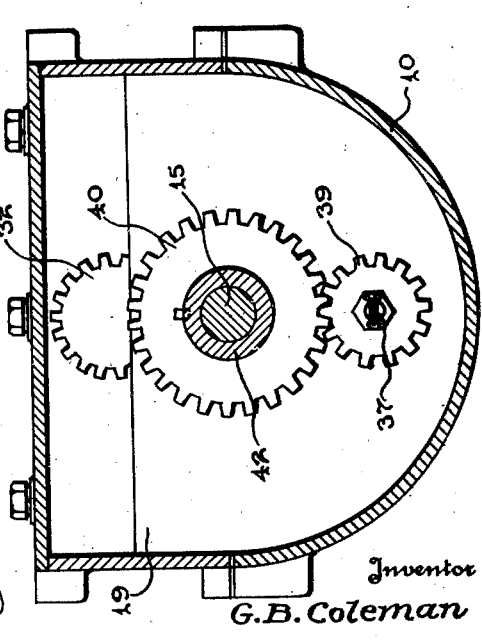

Figures 2, 3, 4 and 5 are respectively transverse vertical sectional views on the lines 2—2, 3—3, 4—4 and 5—5 of Figure 1.

The whole mechanism comprising the invention is housed in a casing 10 in the forward end of which is journaled a driving member 11 and in the rear end of which is similarly journaled a driven member 12, both being mounted in antifriction bearings 14 and represented as short shafts for respective connection to a prime mover, such as a vehicle motor and a load, such as a vehicle driven by the motor. The driving and driven members are axially aligned and connected by a supplemental shaft 15, this latter having a pilot 16 at its forward end journaled in a socket at the rear end of the driving member and at its rear end being provided with a socket in which the pilot 17 on the driven member is journaled. The supplemental shaft 15 is supported at an intermediate point in an antifriction bearing 18 carried by a web 19 formed as an integral part of the casing.

The driving member 11 is provided with a spur gear 20 which may be mounted thereon in any acceptable manner but which in the illustrated embodiment is shown as an integral element thereof. This spur gear 20 meshes with a pinion 21 constituting one of the elements of a reverse mechanism later described. The spur gear 20 is provided on its rear face with a clutch element 22 engageable with a complemental clutch member 23, the latter being an element of a spur gear 24 which is also a part of the reverse mechanism. The spur gear 24 has a peripherally channeled hub 25 for sliding engagement with a fork 26, the latter being carried by a shifter rod 27 mounted in a slide bearing 28 carried by the casing.

By means of the shifter rod and the fork, the gear 24 and its connected clutch element 23 may be moved axially of the supplemental shaft 15 on which it is mounted to operatively connect the clutch members 22 and 23, so that movement to the supplemental shaft may be imparted either in a forwardly or reverse direction, depending on whether the clutch members are engaged, or whether the spur gear 24 is in mesh with the idler pinion 29 of the reverse mechanism. The spur gear 24 has axial movement along the supplemental shaft but is precluded from relative angular movement thereon. With the clutch members 22 and 23 engaged, therefore, the direction of rotation of the supplemental shaft will be the same as that of the driving member and, therefore, the planet carrier 30 of what is herein denominated as a centrifugal device will rotate in the same direction as the driving member, the planet carrier being keyed to the supplemental shaft, as indicated at 31.

Planetary pinions 32 are mounted upon the planet carrier, their shafts 33 being journaled in appropriate bearings in the carrier through which they extend and on the opposite side of which they are connected with the weights 34, the axes of the shafts 33 being to one side of the centers of the weights 34, so that as the carrier rotates, the tendency of the weights is to swing outwardly and thus oppose rotation of the pinions 32 on their own axes. The pinions 32 mesh with a gear 35 carried by the supplemental shaft 15 between the carrier 30 and the bearing 18. This gear 35 is freely movable around the shaft 15, so that if the pinions 32 rotate on their own axes, there may be relative angular movement between the supplemental shaft and the gear 35. Besides meshing with the pinions 32, the gear 35 also meshes with a gear 36, the latter having a shaft 37 journaled in anti-friction bearings 38 mounted in the web 19, the shaft extending through the web and receiving on its opposite end a pinion 39 meshing with a gear 40 keyed, as at 41, to a second carrier, the latter consisting of the complemental elements 42 and 43 connected to provide a carrier or supporting means for the planetary gears 44 and pinions 44ª. This latter carrier spans the connecting ends of the supplemental shaft and the driven member, being floatingly mounted with respect to both, since its element 42 is loosely mounted on the supplemental shaft and the element 43 loosely mounted on the driven member. The planetary gears 44 and pinion 44ª mesh with the pinion 45 and gear 46 carried respectively at the rear end of the supplemental shaft and the forward end of the driven member and shown in the illustrated embodiment of the invention as integral parts of the two. When the gears 44 and pinions 44ª are rotating on their own axes, the carrier comprising the elements 42 and 43 is rotating either in a reverse direction to that of the supplemental shaft 15 or at a slower angular speed than the latter and thus motion is communicated to the driven member at a reduced speed represented by the then active train comprising the gearing 45, 44, 44ª and 46.

For a purpose hereinafter appearing, means is provided to prevent rotation in either direction of the carrier comprising the elements 42 and 43. This means comprises a band 47 having a lining 48 for frictionally engaging the peripheral surface of the element 43 of the carrier and that portion of the element 42 which the band overlaps. The band is mounted for contraction diametrically of the carrier and to this end is terminally connected to a rocker 49 on diametrically opposite sides of a rock shaft 50 by which the rocker is carried. Angular or turning movement to the rock shaft 50 will obviously shift the rocker and thus effect contraction of the band diametrically of the carrier when the lining will be brought into frictional engagement with the peripheral surface thereof and prevent any rotation of the carrier, since the shaft and rocker are carried by the casing so that the band is, therefore, bodily fixed with reference to the casing.

The reverse mechanism hereinbefore referred to consists of means for imparting to the supplemental shaft 15 a direction of rotation reverse to that of the driving member, this means consisting of the pinions 21 and 51 relatively fixed and rotatably mounted on a countershaft 52 journaled at the forward end in the front wall of the casing, as indicated at 53, and at the rear end having a journal 54 rotatably mounted in a bearing in the web 55 formed as an integral part of the casing. In the illustrated embodiment of the invention, the pinions 21 and 51 and their connecting sleeve 56 are integral elements and the pinion 21 meshes with the idler pinion 29. In the one position of the gear 24, it is also in mesh with the pinion 29 and in this position the clutch elements 22 and 23 are disengaged. Therefore, motion to the supplemental shaft 15 is communicated to the latter from the driving member 11 through the train represented by the gear 20, the pinions 21, 51 and 29 and the gear 24. The presence of the pinion 29 in this train effects an angular movement to the supplemental shaft the reverse of the driving member.

The movement of the gear 24 along the supplemental shaft, as by the actuation of the shifter rod 27, will effect first the disengagement of the gear 24 and pinion 29 and, if at this moment no further movement of the shifter rod be made, the gear 24 will stand in a position where it is neither in mesh with the pinion 29 nor its clutch member 23 engaged with the clutch element 22. In such position no motion is communicated to the supplemental shaft from the driving member and hence no movement of the driven member can take place. Further forward movement of the shifter rod will effect engagement of the clutch members 22 and 23 when the movement of the supplemental shaft will be in the same direction as the driving member and at the same speed since it will be communicated directly through the clutch elements.

Since the invention is designed primarily for use in connection with motor vehicles, let it be assumed that it forms the transmission mechanism of such a vehicle and that the driving member 11 is connected to the vehicle engine and the driven member 12 to the propeller shaft. If the vehicle is to be started, the shifter rod is actuated to engage the clutch elements 22 and 23. The supplemental shaft 15 will thereupon be rotated at the speed of the driving member but the driven member 12 will not immediately be rotated at this speed. A torque will be imparted to the latter, however, in excess of the torque of the driving member but at a reduced speed, since the carrier comprising the elements 42 and 43 is free to rotate relative to both the supplemental shaft and the driven member, as is also the carrier 30 and its attendant pinions 32 and weights 34. Since the supplemental shaft 15 rotates at the speed of the driving member 11, the pinion 45 will rotate at this speed and this pinion will communicate rotary motion to the gears 44 and pinions 44ª on their own axes, these latter pinions in turn communicating motion to the driven member through the gear 46. At this time the carrier comprising the elements 42 and 43 will rotate at a slower speed than the supplemental shaft 15 and the driven member 12; or, if the load be great enough, will rotate in a reverse direction thereto, the movement of this carrier depending upon the rate of rotation of the pinions 32 on their own axes. But such rotation of the pinions 32 is opposed by the eccentrically mounted weights 34 since, if the pinions rotate on their own axes, the weights must be moved inwardly and outwardly, and the greater the speed of rotation of these pinions, the greater the inward and outward movement of the weights and hence the greater the work necessary to maintain such movement of the pinions. Therefore, the movement of the weights represents a force tending to oppose the rotation of the pinions 32 on their own axes and this force appears as a turning force tending to rotate the gear 35 in a direction the same as that in which the planet carrier 30 and therefore the supplemental shaft 15 is moving. Hence, through the gear train represented by the gear 36, pinion 39 and gear 40, the carrier comprising the elements 42 and 43 is given a turning impulse in the direction of rotation of the supplemental shaft and thus turning movement is gradually increased by infinitesimal increments until the carrier is accelerated up to the speed of the supplemental shaft, when the pinions 32 will cease rotation on their own axes, as well as the gears 44 and pinions 44ª, and at this time the speed of the driven member will be in synchronism with the supplemental shaft and the driving member. Obviously, the cessation of the axial rotation of the pinions 32 will take place when the heavier ends of the weights 34 are disposed outwardly. This is due to the centrifugal force acting upon the weights in the rotation of the carrier 30.

The braking effect obtained by the construction is secured by the actuation of the rock shaft 50 to effect diametrical contraction of the band 47, as when the vehicle in connection with which the mechanism is employed is descending an incline. The contraction of the band 47 will stop the rotation of the carrier comprising the elements 42 and 43. But the driving member 11 and supplemental shaft 15 are moving in a forward direction as well as the driven member 12 and the tendency of the load under normal conditions would be to accelerate the driving member, but with the present construction the reverse takes place—that is, the forward movement of the driving member tends to retard movement of the driven member at a greater angular speed than the driving member when the carrier 42—43 is at rest. Under such conditions, there would be a tendency of the driven member to rotate the gears 44 and pinions 44ª on their own axes and a consequent tendency to rotate the supplemental shaft through the gear 45 and, were no opposing force provided, this turning force would appear in the driving member wherein it would be opposed only by the tendency of the driving motor or engine to resist acceleration. When the planet carrier 42—43 is at rest, the gear 40 is also at rest and this gear being in mesh with the pinion 39, that also must be at rest as well as the gear 36 carried by the same shaft as the pinion. Also, the gear 35 must remain at rest but this gear meshing with the pinions 32 and the carrier 30 by which these pinions are carried moving with the shaft 15, the pinions 32 are caused to rotate on their own axes, with a resultant inward and outward movement of the weights 34, which movement opposes axial rotation of the pinions which appears as a retarding force to the movement of the carrier and consequently as a retarding force against acceleration of the driving member due to a turning force applied through the driven member. Obviously, under these conditions, the increase of the speed of the driving motor and the consequent increase of speed of the driving member intensifies the retarding force in that it provides for an increased angular velocity of the pinions 32. Thus, the construction functions the reverse of the ordinary arrangement to apply a retarding force in the descent of an incline.

The reverse mechanism comprised in the construction functions merely to impart to the supplemental shaft 15 a turning movement the reverse of that of the driving member 11, and in such reverse turning movement the automatic gear reduction mechanism functions just as in the forward movement of the supplemental shaft, as does also the centrifugal device represented by the planet carrier 30 and its attendant pinions 32 and weights 34.

The invention having been described, what is claimed as new and useful is:

A transmission comprising driving and driven members, a supplemental shaft aligned with and connecting said members, the adjacent ends of said driven member and supplemental shaft being provided with pinions, a planet carrier spanning the connected ends of said driven member and supplemental shaft and having planetary pinions meshing with the pinions on said member and shaft, and a centrifugal device consisting of a carrier fixed to said supplemental shaft and weight controlled pinions operatively connected with the first said carrier.

In testimony whereof he affixes his signature.

GEORGE B. COLEMAN.